United States Patent [19]

Neuray et al.

[11] 4,098,754

[45] Jul. 4, 1978

[54] PROCESS FOR THE PREPARATION OF HIGH MOLECULAR THERMOPLASTIC POLYCARBONATES OF LOW FLAMMABILITY

[75] Inventors: Dieter Neuray, Rumeln-Kandenhausen; Hugo Vernaleken, Krefeld-Bockum; Claus Wulff; Ralf Lange, both of Krefeld, all of Germany

[73] Assignee: Bayer Aktiengesellschaft, Leverkusen, Germany

[21] Appl. No.: 640,109

[22] Filed: Dec. 11, 1975

[30] Foreign Application Priority Data

Dec. 19, 1974 [DE] Fed. Rep. of Germany ....... 2460052

[51] Int. Cl.$^2$ .................... C08G 63/62; C08L 69/00
[52] U.S. Cl. .................... 260/37 PC; 260/18 TN; 260/823; 528/197; 260/DIG. 24
[58] Field of Search ..... 260/47 XA, 37 PC, DIG. 24, 260/77.5 D, 18 TN

[56] References Cited

U.S. PATENT DOCUMENTS

| 3,275,601 | 9/1966 | Schnell | 260/47 |
| 3,775,367 | 11/1973 | Nouvertné et al. | 260/45.9 R |
| 3,836,490 | 9/1974 | Bockmann et al. | 260/47 XA X |
| 3,845,007 | 10/1974 | Nouvertné et al. | 260/37 PC |

OTHER PUBLICATIONS

Chemistry & Physics of Polycarbonates, pp. 199–201, by Herman Schnell, 4/1965.

*Primary Examiner*—Theodore E. Pertilla
*Attorney, Agent, or Firm*—Gene Harsh; Lawrence S. Pope; Frederick H. Colen

[57] ABSTRACT

The present invention is concerned with a process for the production of high molecular weight thermoplastic ppolycarbonates having improved flame resistance and in conjunction with glass fibres, improved mechanical properties and the polycarbonates so produced. A solution polycarbonate is reacted with an alkali metal salt soluble in the melt of the polycarbonate until the Staudinger Index has increased by about 3 to 30 cm$^3$/g. This usually requires about 0.0001 to 0.1 wt. % of the salt, based on the weight of polycarbonate and a temperature of about 250° to 400° C for between about 1 and 30 minutes. In a preferred embodiment the reaction is conducted in a self-cleaning twin screw extruder.

14 Claims, No Drawings

500
PROCESS FOR THE PREPARATION OF HIGH MOLECULAR THERMOPLASTIC POLYCARBONATES OF LOW FLAMMABILITY

FIELD OF THE INVENTION

The present application relates to thermoplastic high molecular weight aromatic polycarbonates of low flammability, having improved properties.

BACKGROUND OF THE INVENTION

Aromatic polycarbonates, especially those based on bisphenol A [=2.2-bis-(4-hydroxyphenyl)-propane], have acquired outstanding importance as engineering plastics because of their excellent mechanical properties, their high electrical resistance and their unusually high heat resistance. They can essentially be produced in according with three different methods (compare H. Schnell, "Chemistry and Physics of Polycarbonates", Polymer Reviews, Vol. IX, page 27 et seq., Interscience Publ., 1964):

1. Using the melt trans-esterification process, so-called melt polycarbonates are obtained by melt trans-esterification of aromatic diphenols with diaryl carbonates under reduced pressure at temperatures of up to about 350° C.
2. Using the solution process in a homogeneous phase (also referred to as the pyridine process), the diphenols are dissolved in organic bases such as pyridine, if appropriate with addition of inert organic solvents, and reacted with phosgene.
3. In the solution process in a disperse phase (the so-called two-phase boundary process), the alkali metal salts or alkaline earth metal salts of the diphenols are dissolved or suspended in an aqueous alkaline phase and reacted in the presence of an inert organic phase which preferably dissolves polycarbonate.

The polycarbonates produced according to processes 2 and 3 are described as solution polycarbonates. Melt polycarbonates and solution polycarbonates are distinguished by different properties: melt polycarbonates differ from solution polycarbonates in having a marked structural viscosity, better fire resistance higher resistance to hydrolysis and better bonding to glass fiber staple; furthermore, glass fiber-reinforced melt polycarbonate moldings can be manufactured with greater accuracy and exhibit less tendency to distortion than articles manufactured from solution polycarbonates. Solution polycarbonates are distinguished, compared to melt polycarbonates, by a lighter color and more advantageous mechanical properties, for example higher notched impact strength. The advantages of the solution polycarbonates manifest themselves particularly after the material has been aged.

Though polycarbonates in themselves, even without flameproofing additives, are classified amongst slow burning plastics, constant endeavors are made further to increase the flame resistance and in doing so particular attention must be given to the fact that the addition of certain halogen-containing compounds usually worsens the processability and mechanical properties.

DT-OS (German Published Specification) Nos. 1,930,257 and 2,253,072 and U.S Pat. No. 3,775,367 have disclosed polycarbonates of low flammability which contain alkali metal or ammonium perfluoroalkanesulphonates. DT-OS (German Published Specification) 2,049,358 and 2,113,987 and U.S. Pat. No. 3,836,490 have disclosed that polycarbonates containing alkali metal salts soluble in the polycarbonate melt — where appropriate in combination with nickel salts — exhibit greater flame resistance. DT-OS (German Published Specification) No. 2,149,311 has disclosed polycarbonates of low flammability, which contain alkali metal salts, which are insoluble in the polycarbonate melt, of inorganic acids and/or of phosphonic acids and/or such sulphonic acids as contain at least one CH bond. Furthermore, DT-OS (German Published Specification Nos. 2,148,598 and U.S. Pat. No. 3,845,007 have disclosed flameproof glass fiber-filled polycarbonate compositions of high impact strength which contain, in addition to 2–6% by weight of glass fibers, 0–3% by weight of chlorine and/or bromine and 0–10% by weight of alkali metal salts and/or nickel salts, and in which compositions the chlorine and/or bromine may have been introduced, for example, in the form of homopolycarbonates or copolycarbonates based on tetrachlorobisphenols or tetrabromobisphenols.

It was now the object of the invention to provide thermoplastic, high molecular aromatic polycarbonates which on the one hand are suitable for reinforcement by glass fibers and are of low flammability, but on the other hand also should possess excellent properties which are not inferior to those of the products which have not been rendered flame-resistant.

SUMMARY OF THE INVENTION

Surprisingly, it has now been found that polycarbonates of low flammability and having a hitherto unknown felicitous combination of outstanding properties are obtained if the melt of a solution polycarbonate is reacted with a basic alkali metal salt, which is soluble in the polycarbonate melt, of an organic compound, at an elevated temperature, until the resulting polycarbonate has Staudinger Index (measured in methylene chloride at 25° C) which is about 3–30 cm$^3$/g, preferably about 3–15 cm$^3$/g, higher than the polycarbonate originally employed. The average residence time of the polycarbonate in the zone of elevated temperature, required for this purpose, is about 1–30 minutes at temperatures between about 250° and 400° C.

The subject of the invention is a process for the preparation of high molecular thermoplastic aromatic polycarbonates of low flammability and modified properties, according to which A. a polycarbonate is mixed with B. about 0.0001–0.1% by weight, preferably with about 0.0003–0.05% by weight, based on A, of basic alkali metal salts, which are soluble in the polycarbonate melt, of organic compounds, characterized in that a solution polycarbonate is employed as A and that A is reacted with B at an elevated temperature between about 250° and 400° C, preferably between about 280° and 380° C, the average residence time of the polycarbonate in the zone of elevated temperature being about 1–30 minutes.

A further subject of the present invention are polycarbonates prepared according to the said process.

Surprisingly, these polycarbonates combine within themselves the excellent resistance to hydrolysis, good flame resistance and marked structural viscosity of the melt polycarbonates and the excellent mechanical properties of the solution polycarbonates.

DETAILED DESCRIPTION OF THE INVENTION

The polycarbonates prepared according to the invention possess, especially in conjunction with glass fibers, have a hitherto unknown combination of properties.

Thus, unexpectedly, the impact strength of the test specimens prepared from the glass fiber-reinforced polycarbonates according to the invention does not decrease on storage in a tropical climate — as is generally customary both for solution polycarbonates and for melt polycarbonates — and instead remains constant or even rises, not infrequently, with increasing duration of storage.

In addition, molding compositions reinforced with glass fiber staple and based on the polycarbonates prepared according to the invention posses the good technological properaties of glass fiber-reinforced melt polycarbonates though they are products prepared by the solution process.

A further subject of the invention is, therefore, the use of the polycarbonates prepared according to the invention for the production of glass fiber-reinforced molding compositions.

As solution polycarbonates suitable for the process according to the invention there may be mentioned aromatic polycarbonates and mixtures of aromatic polycarbonates which have been prepared in accordance with the abovementioned solution processes 2 or 3 and thereof the dihydroxy starting component consists, to the extent of at least about 70 mol %, of bisphenol A; in addition they can contain up to about 30 mol % of other aromatic dihydroxy compounds, for example hydroquinone, resorcinol, 4,4'-dihydroxydiphenyl, bis-(hydroxyphenyl)- alkanes such as, for example, $C_1$—$C_8$—alkylene- and $C_2$—$C_8$—alkylidenebisphenols, bis-(hydroxyphenyl)-cycloalkanes such as, for example, $C_5$—$C_{15}$-cycloalkylene- and $C_5$—$C_{15}$-cycloalkylidene-bisphenols, bis-(hydroxyphenyl)-sulphides, -ethers, -ketones, -sulphoxides or -sulphones and also α,α-bis-(hydroxyphenyl)-diisopropylbenzenes and the corresponding nuclear-alkylated and nuclear-halogenated compounds; amongst these comonomers of bisphenol A, the following are preferred: 2,2-bis-(4-hydroxy-3,5-dichlorophenyl)-propane (tetrachloro-biphenol A), 2,2-bis-(4-hydroxy- 3,5-dibromophenyl)-propane (tetrabromobisphenol A), 2,2-bis-(4-hydroxy-3,5-dimethylphenyl)-propane (tetramethylbisphenol A), 1,1-bis-(4-hydroxyphenyl)-cyclohexane and α,α'-bis-(4-hydroxyphenyl)-p-diisopropylbenzene. However, solution polycarbonates of which the dihydroxy starting component consists to the extent of 100% of bisphenol A are particularly preferred.

The aromatic dihydroxy compounds mentioned here, and further suitable aromatic dihydroxy compounds, are described in U.S. Pat. Nos. 2,991,273; 2,999,835; 2,999,846 3,014,891; 3,028,365; 3,148,172; 3,271,367; 3,271,368 and 3,280,078 in DT-OS (German Published Specification) Nos. 1,570,703; 2,063,050; 2,063,052; 2,211,956 and 2,211,957, in French Patent Specification No. 1,561,518 and in the abovementioned monograph by H. Schnell, pages 86–90.

The solution polycarbonates to be used can be branched as a result of the incorporation of about 0.05–2.0 mol %, based on the dihydroxy starting component, of trihydric or polyhydric polyhydroxy compounds. Polycarbonates of this type are described, for example, in DT-OS (German Published Specification) No. 1,570,533; 1,595,762; 2,113,347 and 2,116,974, British Patent Specification No. 1,079,821 and U.S. Pat. No. 3,544,514 (now Reissue No. 27,682). Examples of trihydric or polyhydric polyhydroxy compounds which can be used are phloroglucinol, 4,6-dimethyl-2,4,6-tris-(4-hydroxyphenyl)-heptene-2,4,6-dimethyl-2,4,6-tris-(4-hydroxyphenyl)-heptane, 1,3,5-tris-(4-hydroxyphenyl)-benzene, 1,1,1-tris-(4-hydroxyphenyl)-ethane, tris-(4-hydroxyphenyl)-phenylmethane, 2,2-bis-[4,4-(4,4'-dihydroxydiphenyl)-cyclohexyl]-propane, 2,4-bis-(4-(4-hydroxyphenyl-isopropyl)-phenyl)-phenol, 2,6-bis(2'-hydroxy-5'-methyl-benzyl)-4-methyl-phenol, 2,4-dihydroxybenzoic acid, 2-(4-hydroxyphenyl)-2-(2,4-dihydroxyphenyl)-propane and 1,4-bis-(4',4"-dihydroxytriphenyl-methyl)-benzene.

The solution polycarbonates to be used have weight average molecular weights $\overline{M}_w$ of about 10,000 to 200,000, preferably of about 20,000 to 80,000, determined with the aid of the light scattering method.

The Staudinger Indices (measured in methylene chloride at 25° C) of the solution polycarbonates to be used are between about 21 cm³/g and 250 cm³/g, preferably between about 37 cm³/g and 116 cm³/g. The Staudinger Index is measured in accordance with the method described below:

Various concentrations of the polycarbonate, in the range from 0 to $10.10^{-3}$ g/cm³ are dissolved in methylene chloride at 25° C and their flow times ($t_{solution}$) are measured in Ubbelohde viscometers with capillary diameters <0.3 mm. In addition, the flow time of the pure solvent ($t_{solvent}$) is measured under the same conditions. The relative viscosity ($\eta_{rel}$) of the sample at the particular concentration is calculated by taking the quotient of $t_{solution}$ and $t_{solvent}$.

$$\eta_{rel} = \frac{t_{solution}}{t_{solvent}}$$

The reduced specific viscosity ($\eta_{red}$) is calculated as follows:

$\eta_{spec.} = \eta_{rel} - 1 \quad \eta_{spec.}$ = specific viscosity $$\eta_{red.} = \frac{\eta_{spec.}}{c} \quad c = \text{concentration (g/cm}^3\text{)}$$

The $\eta_{spec}/c$ values are plotted against the concentrations and extrapolated to concentration c = 0. The point of intersection ofthe straight line extrapolation with the ordinate gives the Staudinger Index. (See also: Fortschritte der Hoch-polymeren-Forschung, Advances in Polymer Science, volume 3, pages 59–106, pringer-Verlag, Berlin-Gottingen-Heidelberg, 1961).

By basic alkali metal salts, soluble in the polycarbonate melt, of organic compounds there are to be understood those salts whereof a 1-normal solution in water has a pH value above about 7, preferably above about 8.5, and which, when worked into polycarbonate at the conncentrations claimed, give transparent moldings.

Examples of suitable alkali metal salts in the sense of the invention are the alkali metal salts, especially the sodium salts and potassium salts, of aliphatic, aromatic or aliphatic-aromatic monobasic or dibasic, optionally halogenated, carboxylic acids with 1 to 24 carbon atoms, such as those of formic acid, acetic acid, propionic acid, butyric acid, isobutyric acid, valeric acid, caproic acid, oenanthic acid, caprylic acid, pelargonic acid, capric acid, lauric acid, stearic acid, behenic acid, 5-ethyl-dioxan-1,3-yl-5-carboxylic acid, 3-(3,5-di-tert.-butyl-4-hydroxyphenyl)-propionic acid, oleic acid, oxalic acid, malonic acid, succinic acid, glutaric acid, adipic acid, pimelic acid sebacic acid, benzoic acid and its p-alkylated derivatives with 1 to 8 carbon atoms in the alkyl radical, salicyclic acid, terephthalic acid, isophthalic acid, phthalic acid monobenzyl ester, diglycollic acid monodecyl ester, adipic acid monobutyl ester and 3-chlorobenzoic acid; further examples of suitable compounds are the alkali metal salts, espe cially the sodium salts and potassium salts of carboxylic acid amides or carboxylic acid imides with 1 to 24 carbon atoms, such as those of ε-caprolactam or phthalimide; yet further examples of suitable compounds are the alkali metal salts, especially the sodium salts and potassium salts, of linear or branched aliphatic, cycloaliphatic or araliphatic monohydric to tetrahydric, optionally halogeneated alcohols with 1 to 12 carbon atms, such as methanol, ethanol, n-propanol, i-propanol, n-butanol, tert.- butanol, n-hexanol, 2-ethylhexanol, n-dodecanol, ethylene glycol, butanediol-1,3,butanediol-1,4,2-ethylhexanediol-1,3, hexanediol-1,6, glycerol, trimethylolpropane, pentaerythritol, cyclopentanol, cyclohexanol, cyclododecanol, 1,4-di-)hexdroxy-methyl)-cyclohexane, benzyl alcohol and β-phenylethyl alcohol.

Preferred alkali metal salts in the sense of the invention are the alkali metal salts, especially the potassium salts and sodium salts, of monohydric to tetrahydric phenols, such as those of phenol, o-, m- and p-cresol and p-tert.-butyl -phenol and salts of the diphenols and polyphenols mentioned hereinabove as suitable for the preparation of the solution polycrbonates and for their branching; the potassium salts and sodium salts of bis-(4-hydroxyphenyl)-alkanes and -cycloalkanes are particularly preferred.

The alkali metal salts can be incorporated into the solution polycarbonates in various ways. After having prepared the polycarbonate, the salts can be added either to the organic phase which contains the solution polycarbonate or to a melt of the solution polycarbonate. It does not suffice to combine the solution polycarbonates and alkali metal salts, for example in the form of their solutions, or homogenize them by means of a mixing extruder without providing adequate opportunity for a reaction of the components in a melt.

Instead it is absolutely essential, according to the invention, to allow the polycarbonate/alkali metal salt mixture to react at temperatures above the melting point and below the decomposition point of the particular solution polycarbonates used, until the Staudinger Index has risen to the abovementioned degree.

It has proved advantageous to effect the addition of the alkali metal salts in screw machines, advantageously in twin-screw machines, especially in intermeshing twin-screw machines. Evidently the frictional heat which is here generated within a locally defined region exerts an essential influence on the reaction of the solution polycarbonate with the alkali metal salt.

If the alkali metal salts are to be admixed to a polycarbonate solution before extrusion on a screw machine, it is as a rule desirable to incorporate the salts in the form of concentrated solutions. Suitable solvents for the alkali metal salts include polar solvents, for example alcohols with 1 to 4 carbon atoms, and cyclic ethers such as 1,4-dioxane and tetrahydrofurane, but also aprotic polar solvents such as dimethylformamide, N-methylpyrrolidone or dimethyl-sulphoxide. When incorporating the alkali metal salts into the polycarbonate melt it is advisable to add the salts as such unless the screw machines used for the subsequent extrusion are fitted with a devolatilization section; if such a section is present, the alkali salts can also, without detriment, be metered-in as their solutions.

The selected reaction temperature, the alkali metal salt concentration and the residence time of the polycarbonate or alkali metal salt mixture in the zone of elevated temperature have an influence on the rise in the Staudinger Index. With increasing temperature and increasing alkali metal salt concentration, the residence time required to attain the desired polycarbonate properties decreases.

The concentrations of the basic alkali metal salts contained in the polycarbonates prepared by the process according to the invention have been chosen in accordance with what has proved practicable under industrial conditions. Of course, it is also possible to select concentrations which go beyond the limits claimed, if the reaction conditions in the screw machine, especially the residence time, are modified accordingly.

If the alkali metal salts and/or the solution polycarbonates are employed in the form of their solutions, the solvents can be removed more rapidly if the reaction is carried out under reduced pressure.

The process for the preparation of the thermoplastic molding compositions in the sense of the invention can be carried out either continuously or discontinuously.

The polycarbonates according to the invention are outstanding suitable for the production of glass fiber-reinforced molding compositions which contain between about 10 and 40% by weight, relative to the total molding compositions, of glass fibers. Suitable glass fiber materials which can be used for the production of these reinforced molding compositions are all commercially available types of glass fiber, for example rovings, staple fibers or cut glass filaments, provided they have been finished, by means of suitable sizes and/or adhesion promoters, to make them compatible with polycarbonate. They are usually incorporated into the polycarbonates in lengths of about 0.05 to 60 mm and diameters of about 5 to 15 $\mu$m and then have an average fiber length of about 50 to 500 $\mu$m, preferably of about 50 to 200 $\mu$m, in the reinforced polycarbonate composition. Water-sized, filamentized staple glass fibers, such as are described, for example, in DT-AS (German Published Specification) No. 1,201,991 are particularly suitable. The glass fibers can be incorporated either into the polycarbonate solution or into the polycarbonate melt, before, together with or after the addition of the alkali metal salts.

In most cases it is customary to extrude the polycarbonates according to the invention or the glass fiber-reinforced polycarbonate compositions according to the invention, to bristles and chop or grind these to form granules. The resulting product can then be converted, for example by injection molding or extrusion, to impact-resistant moldings such as are used, for example, in instrument-making generally, in precision engineering, in electrical engineering or in telecommunication. Of course, they are also outstandingly suitable for the production of semi-finished goods such as sheets, rods and profiles.

The parts mentioned in the examples which follow are parts by weight and percentages are percentages by weight.

The impact strength was determined by the flexural impact test according to DIN 53,453, at 23° C and 50% relative atmospheric humidity (standard climatic conditions) and, in the case of some examples, additionally at 40° C and 96% relative atmospheric humidity (tropical climatic conditions).

The impact strength after storage under standard climatic conditions was measured after a minimum storage of 16 hours.

To assess the burning characteristics of the polycarbonates, firstly the $O_2$ Index (according to ASTM-D 2863-70) and secondly the so-called IBM burning test were employed. The burning test is carried out as follows:

Test specimens of size 120 × 10 × 4 mm are suspended vertically and exposed to a 2 cm high Bunsen burner flame (without air supply). The Bunsen burner is at a distance of 1 cm. The time for which the test bar can be exposed to the flame, in the manner described, without continuing to burn more than 30 seconds after removing the igniting flame, and without burning particles dripping off and igniting a pad of cottonwool lying beneath the test bar, is determined.

EXAMPLE 1

A polycarbonate with a Staudinger Index of 43.7 $cm^3/g$ is prepared by the two-phase boundary process according to U.S. Pat. No. 3,275,601 from bisphenol A and phosgene, with the addition of 4.0 mol %, relative to bisphenol A of p-tert.-butylphenol as a molecular weight stopper. The solution of the polycarbonate in a methylene chloride/chlorobenzene mixture (1:1), which has been washed until neutral and free from electrolyte (conductivity <1.0 × 10$^{-4}$ sec/cm) is extruded in an intermeshing twin-screw devolatilization extruder having a barrel diameter of 62 mm, at a barrel temperature of 300° C and a screw speed of 20 revolutions per minute, to give bristles which are passed round a rotating water-cooled drum and are then chopped to form granules. The Staudinger Index of the polycarbonate granules (sample a) is 43.7 $cm^3/g$, as before.

Using a piston pump, varying amounts of a solution of 1 g of disodium bis-phenolate A in 1,000 ml of a chlorobenzene/methanol (95:5% by volume) mixture are fed into the polycarbonate solution before it enters the extruder, and are extruded together with the solution polycarbonate. The residence time in the screw is about 15 minutes. As the sodium bisphenolate concentration is increased, the Staudinger Index of the extruded polycarbonate rises (see Table 1, samples b–d). Some dimensional data of samples 1 a–d are summarized in Table 1. Thereafter, the granules (samples b–d) are fused in a commercial ZSK 83 twin-screw extruder of Messrs. Werner and Pfleiderer and varying amounts of a water-sized (approximately 0.1% by weight of water) filamentized staple glass fiber of average diameter about 10μm and average length about 0.25 mm, according to the Example of DT-AS (German Published Specifiction) No. 1,201,991 are incorporated. The resulting granules containing glass fiber are injection-molded to give standard small bars. The measured data are summarized in Table 2.

EXAMPLE 2

Analogously to Example 1, a solution polycarbonate having a Staudinger Index of 50.3 $cm^3/g$ is prepared from bisphenol A and phosgene, together with 3.4 mol %, based on bisphenol A, of p-tert.-butylphenol, reacted with varying amounts of disodium bisphenolate A solution in twin-screw devolatilization extruder at barrel temperatures of 300° and 310° C and screw speeds of 20 and 30 revolutions per minute, and then reinforced with 20 to 24% by weight, based on the sum of polycarbonate and glass fiber, of a water-sized filamentized staple glass fiber (samples a–c).

The Staudinger Indices of the non-reinforced polycarbonates and the measured data of the reinforced and nonreinforced products are shown in Tables 1 and 2.

EXAMPLE 3 (COMPARISON)

Analogously to Example 1, a solution polycarbonate having a Staudinger Index of 59.1 $cm^3/g$ is prepared from bisphenol A and phosgene, with addition of 2.8 mol %, relative to bisphenol A, of p-tert.-butylphenol, and is extruded, without addition of alkali metal salt, by means of the 62 mm twin-screw devolatilization extruder. The Staudinger Index of the resulting polycarbonate granules is 59.1 $cm^3/g$, as before. (For properties, see Table 1).

After incorporating the water-sized, filamentized staple glass fibers according to Example 1, in amounts of 20% by weight (sample a) or 30% by weight (sample b), the properties are determined. The results are shown in Table 2.

EXAMPLE 4

In an intermeshing 120 mm twin-screw devolatilization extruder of Messrs. Werner and Pfleiderer, running at a barrel temprature of 330° C and a screw speed of 120 revolutions per minute, a solution of 15 g of sodium bisphenolate in 1,000 ml of a methanol/chlorobenzene (1:1% by volume) mixture is metered into a solution of a solution polycarbonate based on bisphenol A, prepared according to Example 2 and having Staudinger Index of 51.2 $cm^3/g$, and the composition is extruded to give bristles which are chopped in accordance with Example 1 to form granules. The residence time in the extruder is about 7 minutes. The Staudinger Index of the polycarbonate after incorporation of the alkali metal salt, and some measured data of the product, are summarized in Table 1.

Thereafter, about 20% by weight (sample a) or about 30% by weight (sample b) of the water-sized filamentized staple glass fibers are incorporated analogously to Example 1.

The measured data of the glass fiber-reinforced product (samples 4 *a* and *b*) are summarized in Table 2.

EXAMPLE 5 (COMPARISON)

Granules of the solution polycarbonate prepared according to Example 3, having a Staudinger Index of 59.1 $cm^3/g$ are fused in a twin-screw extruder having a filling tube, so designed that after a melting zone the polycarbonate melt passes a further filling tube; the polycarbonate is fed into the hopper of the extruder via a metering weigher, in an amount of 120 g per minute. Through the second filling orifice, glass fiber of average fiber length 4.5 mm and average diameter 10 μm is introduced into the polycarbonate melt in an amount of 30 g/minute (sample a) or 53 g/minute (sample b). The screw speed is 20 revolutions per minute and the barrel temperature is 310° C. Table 2 shows the measured data.

EXAMPLE 6

Cut glass fiber is incorporated, analogously to Example 5, sample a, into the polycarbonate prepared according to Example 2, sample b, which has Staudinger Index of 59.1 $cm^3/g$. The impact strength of a standard test bar produced from the resulting molding material was 96 KJ/$m^2$.

TABLE 1

Properties of non-reinforced polycarbonates

| Example | $(\eta)^{a)}$ before extrusion (cm³/g) | Na₂-BPA$^{b)}$ % by weight relative to polycarbonate | Screw speed (revolutions per minute) | Barrel temperature (°C) | $(\eta)^{a)}$ after extrusion (cm³/g) | O-index | IBM burning test (sec.) | Notched impact strength (KJ/m²) | Apparent melt viscosity at a rate of deformation D of 10¹/sec (Pas) | 2×10³/sec (Pas) |
|---|---|---|---|---|---|---|---|---|---|---|
| 1a | 43.7 | — | 20 | 300 | 43.7 | 0.25 | 5 | 35 | | |
| 1b | 43.7 | 0.005 | 20 | 300 | 50.8 | 0.31 | | | | |
| 1c | 43.7 | 0.0075 | 20 | 300 | 51.9 | 0.32 | 20 | 31 | 5 10² | 1.8×10² |
| 1d | 43.7 | 0.01 | 20 | 300 | 52.6 | 0.32 | 24 | 34 | | |
| 2a | 50.3 | 0.0075 | 20 | 300 | 57.5 | 0.30 | 22 | 35 | | |
| 2b | 50.3 | 0.01 | 20 | 310 | 59.1 | 0.32 | 25 | 37 | 1.1×10³ | 3×10² |
| 2c | 50.3 | 0.01 | 30 | 310 | 64.6 | 0.32 | 25 | 43 | | |
| 3 | 59.1 | — | 20 | 310 | 59.1 | 0.26 | 10 | 53 | 1.4×10³ | 7.4×10² |
| 4 | 51.2 | 0.0011 | 120 | 330 | 59.3 | 0.31 | 15 | 35 | 1.6×10³ | 3.2×10² |

$^{a)}$Staudinger Index
$^{b)}$Disodium salt of bisphenol A
$^{c)}$test temperature 300° C, test nozzle: length 20 mm, diameter 1mm.

TABLE 2

Properties of glass fiber-reinforced polycarbonate molding materials

| Example | Glass fiber Content$^{a)}$ (% by weight) | Mean length of glass fibers$^{b)}$ (μm) | Impact strength according to DIN 53,453 [KJ/m²] standard climatic Conditions$^{c)}$ | after storage under tropical climatic conditions 10 days | 20 days | 50 days |
|---|---|---|---|---|---|---|
| 1b | 27.4 | 125 | 68 | 81 | 71 | 79 |
| 1c | 21.4 | 114 | 81 | 90 | 96 | 96 |
| 1d | 23.3 | 128 | 75 | 98 | 77 | 84 |
| 2a | 20.8 | 101 | 113 | n.b.$^{c)}$ | n.b. | n.b. |
| 2b | 23.2 | 97 | 101 | n.b. | n.b. | n.b. |
| 2c | 23.5 | 134 | 111 | n.b. | n.b. | n.b. |
| 3a | 21.8 | 113 | 65 | 62 | 57 | 52 |
| 3b | 28.6 | 125 | 43 | 39 | 35 | 33 |
| 4a | 19.3 | 107 | 89 | n.b. | n.b. | n.b. |
| 4b | 29.5 | 101 | 64 | 61 | 64 | 66 |
| 5a | 20.0 | 294 | 75 | 69 | 66 | 57 |
| 5b | 30.6 | 281 | 49 | 44 | 42 | 36 |

$^{a)}$relative to the polycarbonate molding composition
$^{b)}$in the molding composition
$^{c)}$not broken

EXAMPLE 7 (COMPARISON)

6.850 g (30 mols) of bisphenol A and 6,747 g (31.5 mols) of diphenyl carbonate, with addition of 0.0245 g (0.00009 mol) of disodium bisphenolate A, are transesterified in an autoclave, equipped with stirrer and distillation device, at temperatures between 180° C and 250° C, 87% of the theoretical amount of phenol being distilled off at a pressure of 100 – 3 mm Hg. To achieve the desired viscosity of the melt, the pressure is lowered to <1 mm Hg and the reaction is completed at between 280° and 310° C. The resulting melt polycarbonate has a Staudinger Index of 57.5 cm ³/g.

O₂ Index: 0.32; IBM burning test: 15 seconds; notched impact strength 22 KJ/m².

20% (sample a) or 30% (sample b) of filamentized staple glass fibers are incorporated into this melt polycarbonate as described in Example 1.

Impact strength (standard climatic conditions):
polycarbonate a): 75 KJ/m²
polycarbonate b): 42 KJ/m²

Impact strength after storage under tropical climatic conditions (measured in KJ/m²).

| | 10 days | 20 days | 50 days |
|---|---|---|---|
| Polycarbonate a) | 69 | 66 | 57 |
| Polycarbonate b) | 39 | 36 | 34 |

EXAMPLE 8

To the melt of the glass fiber-reinforced solution polycarbonate prepared according to Example 3, sample b, and having a Staudinger Index of 59.1 cm³/g, is added a disodium bisphenolate A solution (1 g of sodium bisphenolate in 1,000 ml of chlorobenzene/methanol (95.5% by volume) mixture) analogously to Example 1, in a 62 mm twin screw devolatilization extruder. Screw speed 30 revolutions per minutes; barrel temperature: 300° C. The disodium bisphenolate A content, relative to the polycarbonate, is 0.007% by weight. Staudinger Index of the polycarbonate containing the alkali metal salt: 64.8 cm³/g, impact strength: 98 KJ/m².

EXAMPLE 9

The filamentized staple glass fibers and the disodium bisphenolate A in the form of a solid are fed simultaneously into the melt of a solution polycarbonate prepared according to Example 2 and having a Staudiner Index of 51.2 cm³/g, in a commercially available 120 mm twin-screw extruder of Messrs. Werner and Pfleiderer, analogously to Example 1, and the mixture is extruded at 290°–300° C at a screw speed of 140 revolutions per minute. The residence time in the extruder is about 7 minutes.

The resulting polycarbonate molding material contains 19.8% of glass fibers having an average fiber length of 98 μm and 0.002% by weight of disodium bisphenolate A.

Staudinger Index of the polycarbonate containing the alkali metal salt: 57.3 cm³/g, impact strength: 107 KJ/m².

EXAMPLE 10

Analogously to Example 2, various alkali metal salts in amounts of 0.004 – 0.027% by weight, relative to the polycarbonate, are fed into the solution of a solution polycarbonate having a Staudinger Index of 50.3 cm³/g and the mixtures are extruded at 290°–300° C in the 62 mm twin screw devolatilization extruder at a screw speed of 30 revolutions per minute. Residence time of the composition in the extruder: about 15 minutes. 20% of filamentized staple glass fibers are then incorporated analogously to Example 1.

The Staudinger Indices after incorporation of the alkali metal salt and the impact strength of the glass fiber-reinforced polycarbonate are summarized in Table 3.

EXAMPLE 11

(a) Using the two-phase boundary process, a copolycarbonate having a Staudinger Index of 57.5 cm³/g is prepared from 85 mols of bisphenol A, 15 mols of 1,1-bis-(4-hydroxyphenyl)-cyclohexane and phosgene, with addition of 2.9 mol %, relative to the sum of the dihydroxy compounds, of p-tert.-butylphenol. 20% of a water-sized filamentized glass fiber staple are then incorporated analogously to Example 1. Impact strength: 51 KJ/m².

(b) Analogously to Example 1, a copolymer prepared from 85 mols of bisphenol A, 15 mols of 1,1-bis-(4-hydroxyphenyl)-cyclohexane and phosgene, with the addition of 3.5 mol %, relative to the sum of the dihydroxy compounds, of p-tert.-butylphenol as a chain stopper, and having a Staudinger Index of 49.6 cm³/g, is reacted with a solution of disodium bisphenolate A in 1,000 ml of chlorobenzene/methanol (95:5% by volume) in an intermeshing 62 mm twin screw devolatilization extruder at a barrel temperature of 300° C and a screw speed of 30 revolutions per minute. The residence time of the disodium bisphenolate A in the screw is about 15 minutes and the concentration if 0.01% relative to the copolycarbonate.

The Staudinger Index of the resulting granules is 56.5 cm³/g. 20% by weight of the filamentized glass fiber staples are then incorporated analogously to Example 1. Impact strength of the test specimens produced from the resulting molding composition: 73 KJ/m³.

Although the invention has been described in considerable detail in the foregoing for the purpose of illustration, it is to be understood that such detail is solely for that purpose and that variations can be made therein by those skilled in the art without departing from the spirit and scope of the invention.

What is claimed is:

1. A process for preparing a polycarbonate comprising reacting in a self-cleaning twin-screw extruder the melt of a solution polycarbonate with a basic alkali metal salt of an organic compound selected from the group consisting of a carboxylic acid amide or imide containing up to 24 carbon atoms per molecule, a linear or branched aliphatic, cycloaliphatic or araliphatic monohydric to tetrahydric, optionally halogenated, alcohol with one to 12 carbon atoms, and a mono- to tetrahydric phenol, which is soluble in the melt, at an elevated temperature between about 280° and 380° C, until the resulting polycarbonate has Staudinger Index (measured in methylene chloride at 25° C) which is from about 3 to 30 cm³/g higher than the original polycarbonate.

2. The process according to claim 1 wherein the Staudinger Index of the resulting polycarbonate is from about 3 to 15 cm³/g higher than the original polycarbonate.

3. A process for the preparation of a higher molecular weight thermoplastic aromatic polycarbonate which comprises reacting in a self-cleaning twin-screw extruder an aromatic solution polycarbonate with from about 0.0001 to 0.1% by weight, relative to the solution polycarbonate, of a basic alkali metal salt of an organic compound selected from the group consisting of a carboxylic acid amide or imide containing up to 24 carbon atoms per molecule, a linear or branched aliphatic, cycloaliphatic or araliphatic monohydric to tetrahydric, optionally halogenated, alcohol with 1 to 12 carbon atoms, and a mono- to tetrahydric phenol which is soluble in the polycarbonate melt, at a temperature between about 280° and 380° C, for a period of from about 1 to 30 minutes.

4. The process according to claim 1 wherein the solution polycarbonate contains at least 70 mol % of units derived from 2,2-bis-(4-hydroxyphenyl)-propane.

5. The process according to claim 1 wherein the solution polycarbonate is a copolymer of 2,2-bis-(4-hydroxyphenyl)-propane and another copolymerizable aromatic dihydroxy compound.

6. The process according to claim 4 wherein the solution polycarbonate contains from 0.05 to 2.0 mol % based on dihydroxy starting component, of branched units derived from a tri- or polyhydroxy compound.

7. The process according to claim 1 wherein the solution polycarbonate has an initial weight average

TABLE 3

Molding materials according to Example 10, obtained from a solution polycarbonate having a Staudinger Index of 50.3 cm³/g, alkali metal salts and 20% of filamentized water-sized staple glass fibers.

| Alkali Metal Salt | % of alkali metal salt based on polycarbonate | $[\eta]^{a)}$ after reaction with the alkali metal salt $[cm^3/g]$ | Impact strength $[KJ/m^2]$ |
|---|---|---|---|
| K tert.-butylate | 0.006 | 54.7 | 94 |
| Na salicylate | 0.014 | 61.9 | 108 |
| Potassium phthalimide | 0.0096 | 58.6 | 102 |
| Na ε-caprolactamate | 0.013 | 57.2 | 106 |
| K acetate | 0.005 | 56.7 | 98 |
| K isooctanoate | 0.009 | 58.9 | 101 |
| Na stearate | 0.027 | 64.9 | 109 |
| K₂ salt of 2,2-bis-(3,5-dimethyl-4-hydroxyphenyl)-propane | 0.004 | 62.2 | 111 |
| Na p-tert.-butyl-phenolate | 0.02 | 58.8 | 95 |

$^{a)}$Staudinger Index molecular weight of from 10,000 to 200,000 as determined by light-scattering.

8. The process according to claim 1 wherein the solution polycarbonate has an initial Staudinger Index (measured in methylene chloride at 25° C) of from 21 to 250 cm$^3$/g.

9. A process for preparing a polycarbonate comprising reacting in a self-cleaning twin-screw extruder the melt of a solution polycarbonate having a weight average molecular weight, $\overline{M}_w$, of about 10,000 to 200,000 with a basic alkali metal salt, which is soluble in the melt, of an organic compound at an elevated temperature between about 280° and 380° C until the resulting polycarbonate has a Staudinger Index (measured in methylene chloride at 25° C) which is from about 3 to 30 cm$^3$/g higher than the original polycarbonate and reinforcing the molding composition with about 10–40% by weight, relative to the total molding composition, of glass fibers.

10. The process according to claim 9 wherein said alkali metal salt is an alkali metal salt of an aliphatic, aromatic or aromatic-aliphatic mono- or dibasic, optionally halogenated, carboxylic acid containing from 1 to 24 carbon atoms per molecule, or of a carboxylic acid amide or imide containing up to 24 carbon atoms per molecule, or of a linear or branched aliphatic, cycloaliphatic or araliphatic monohydric to tetrahydric, optionally halogenated, alcohol with 1 to 12 carbon atoms, or of a mono- to tetrahydric phenol.

11. A polycarbonate prepared by a process comprising reacting in a self-cleaning twin-screw extruder the melt of a solution polycarbonate having a weight average molecular weight, $\overline{M}_w$, of about 10,000 to 200,000 with a basic alkali metal salt of an organic compound selected from the group consisting of a carboxylic acid amide or imide containing up to 24 carbon atoms per molecule, linear or branched aliphatic, cycloaliphatic or araliphatic monohydric to tetrahydric, optionally halogenated, alcohol with 1 to 12 carbon atoms, or of a mono- to tetrahydric phenol which is soluble in the melt, at an elevated temperature between about 280° and 380° C until the resulting polycarbonate has a Staudinger Index which is from about 3 to 30 cm$^3$/g higher than the original polycarbonate.

12. A molded article formed from a polycarbonate prepared by a process comprising reacting in self-cleaning twin-screw extruder the melt of a solution polycarbonate having a weight average molecular weight, $\overline{M}_w$, of about 10,000 to 200,000 with a basic alkali metal salt of an organic compound selected from the group consisting of a carboxylic acid amide or imide containing up to 24 carbon atoms per molecule, a linear or branched aliphatic, cycloaliphatic or araliphatic mono- hydric to tetrahydric, optionally halogenated, alcohol with 1 to 12 carbon atoms, and a mono- to tetrahydric phenol which is soluble in the melt, at an elevated temperature between about 280° and 380° C, until the resulting polycarbonate has a Staudinger Index which is from about 3 to 30 cm$^3$/g higher than the original polycarbonate.

13. A polycarbonate prepared by a process comprising reacting in a self-cleaning twin-screw extruder the melt of a solution polycarbonate having a weight average molecular weight, $\overline{M}_w$, of about 10,000 to 200,000 with a basic alkali metal salt, which is soluble in the melt, of an organic compound at an elevated temperature between about 280° and 380° C until the resulting polycarbonate has a Staudinger Index (measured in methylene chloride at 25° C) which is from about 3 to 30 cm$^3$/g higher than the original polycarbonate and reinforcing the molding composition with about 10–40% by weight, relative to the total molding composition, of glass fibers.

14. A molded article formed from a polycarbonate prepared by a process comprising reacting in a self-cleaning twin-screw extruder the melt of a solution polycarbonate having a weight average molecular weight, $\overline{M}_w$, of about 10,000 to 200,000 with a basic alkali metal salt, which is soluble in the melt, of an organic compound at an elevated temperature between about 280 and 380° C until the resulting polycarbonate has a Staudinger Index (measured in methylene chloride at 25° C) which is from about 3 to 30 cm$^3$/g higher than the original polycarbonate and reinforcing the molding composition with about 10–40% by weight, relative to the total molding composition, of glass fibers.

* * * * *